July 30, 1946.        A. R. VAN C. WARRINGTON        2,405,084
PROTECTIVE APPARATUS
Filed Nov. 9, 1944
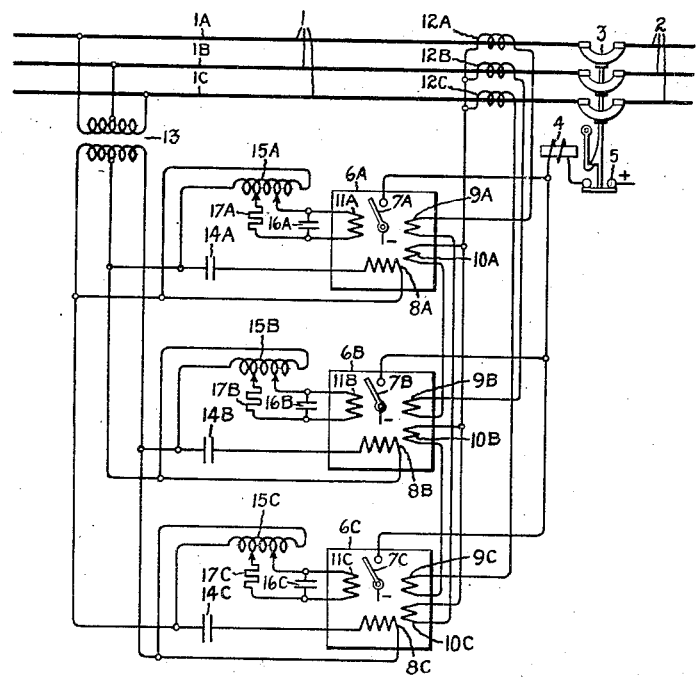
Inventor:
Albert R. van C. Warrington,
by Harry E. Dunham
His Attorney.

Patented July 30, 1946

2,405,084

UNITED STATES PATENT OFFICE 2,405,084

PROTECTIVE APPARATUS

Albert R. van C. Warrington, Wallingford, Pa., assignor to General Electric Company, a corporation of New York Application November 9, 1944, Serial No. 562,673

4 Claims. (Cl. 175—294)

My invention relates to protective apparatus and more particularly to protective apparatus for electric circuits employing instantaneous voltage-restrained fault responsive relays such, for example, as voltage-restrained power directional relays, which are now well known in the art as mho relays.

In order that a directional relay may function properly under fault conditions, when the voltage of the electric circuit at the point where the relay is connected thereto quickly decreases to a very low value, it has been common practice for some time to provide the potential circuit of the directional relay with suitable means, often referred to as memory action producing means, which operates to maintain across the relay potential circuit, for a short time interval after the fault occurs, a potential having the same phase relation as the potential that existed just prior to the occurrence of the fault. My United States Letters Patents 1,895,357 and 2,287,504, granted January 24, 1933, and June 23, 1942, respectively, and assigned to the same assignee as this application, disclose arrangements for obtaining such a memory action.

I have found, however, that when such a directional relay with memory action is also provided with a voltage restraint and is used as a mho type of distance relay, the relay tends to operate in a tripping direction when a fault occurs beyond the normal reach of the relay. This undesirable operation of the relay is believed to be due to the torques produced by the transient currents which are caused to flow in the relay windings in response to the sudden changes that occur in the circuit current and voltage at the inception of a fault.

One object of my invention is to provide a voltage-restrained distance relay which does not operate improperly in response to faults that occur beyond the normal reach of the relay.

Another object of my invention is to provide an improved mho type of distance relay which does not overreach under fault conditions.

In accordance with my invention, I provide the circuits of the voltage restraining element of the relay with suitable memory action producing means so as to maintain the voltage restraining torque long enough to override the transient overreaching tendency of the operating torque element produced by the memory action producing means associated with the potential circuits thereof.

My invention will be better understood from the following description when taken in connection with the accompanying drawing, the single figure of which diagrammatically illustrates an embodiment of my invention in connection with a protective arrangement for an alternating current system, and the scope of my invention will be pointed out in the appended claims.

In the accompanying drawing, I have shown a portion of an alternating current power system comprising a polyphase circuit 1 having three phase conductors 1A, 1B and 1C. The polyphase circuit 1 is connected to another polyphase circuit 2 by a latched closed circuit breaker 3 having a trip coil 4 which, when energized, effects the opening of the circuit breaker. The circuit breaker 3 also is provided with suitable auxiliary contacts 5 which are connected in series with the trip coil 4 and which are arranged to be closed when the circuit breaker is closed and to be open when the circuit breaker is open.

For effecting the opening of the circuit breaker 3 when a fault occurs on the circuit 1 within a predetermined distance from the circuit breaker, I provide for each phase of the circuit 1 a single phase distance relay 6 of the mho type which, when it moves its movable member 7 to the closed position, completes an energizing circuit for the trip coil 4. In the drawing, each mho relay and associated apparatus has applied thereto a letter to characterize the particular phase conductor of the circuit 1 with which it is associated.

Each mho relay is provided with a voltage winding 8 and two current windings 9 and 10, which are so arranged on the relay structure and so connected to the electric circuit 1 in a manner well known in the art that there is produced on the movable member 7 of the relay an operating torque which is in a direction to move the member 7 to its closed position and which is proportional to $EI \cos(\theta - \phi)$, where E, I and $\theta$ are respectively the voltage, current and power factor of the associated phase of the circuit 1, and $\phi$ is the angle between E and I for maximum torque of the relay. Each mho relay also is provided with a voltage winding 11, which is so arranged on the relay structure and so connected to the electric circuit 1 in a manner well known in the art that it reacts with the potential polarizing winding 8 and produces on the movable member of the relay a restraining torque which is proportional to the square of the voltage of the circuit 1.

The circuit of the voltage winding 8 of each relay also has connected therein suitable means, examples of which are well known in the art, for producing a memory action. As shown in the drawing, this means consists of a series connected capacitor 14 which is of such a value as to tune the circuit of the winding 8 to approximate resonance at the frequency of the circuit 1.

Each voltage restraining winding 11 is connected to the proper phase of the transformer 13 through an adjustable autotransformer 15 in a manner well known in the art.

In accordance with my invention, I also provide the circuit of the voltage winding 11 of each relay with suitable memory action producing means such as a capacitor 16 connected in parallel with the winding 11 and a dissipating resistor 17 connected in series therewith. The capacitor 16 and resistor 17 are arranged in a manner well known in the art so as to produce a current resonant condition in the circuit of the associated voltage winding 11 when the voltage across the power circuit decreases due to a fault on the circuit 1.

It will be noted that each potential winding 8 is connected for series resonance without a dissipating resistor so that the memory action lasts as long as possible which may be for several cycles and becomes increasingly effective as the circuit voltage falls, with maximum effectiveness being attained at zero volts. Each potential winding 11 is connected for parallel resonance with a dissipating resistor so designed that the memory action, which is effective when a drop in the circuit voltage occurs, lasts only until the expiry of the undesirable transient tripping torque which occurs in about half a cycle.

The longer memory action of the series resonance circuit overcomes a natural defect of all ordinary directional relays which have the undesirable characteristic of operating more slowly for faults near the relay location since the voltage and hence the operating torque decrease as the fault approaches the relay location. The series resonance circuit, on the other hand, enables the relay to have its maximum speed when the fault is close to the relay location. Tests have shown that when the operating time of the relay is about .03 second for a fault at 50% of the ohmic distance for which the mho relay is set, the operating time is shortened to only .012 second when the fault is so located as to decrease to zero the voltage applied to the relay voltage windings.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a fault responsive relay for an alternating current circuit, a movable member, means for exerting on said member an operating torque in response to a fault on said circuit, voltage restraint means for said member comprising a plurality of windings energized by voltages proportional to the voltage of said circuit, and means for delaying for a predetermined time any substantial change in the voltage applied to said windings when the voltage of said circuit suddenly decreases.

2. In a fault responsive relay for an alternating current circuit, a movable member, means for exerting on said member an operating torque in response to a fault on said circuit, voltage restraint means for said member comprising a plurality of windings energized by voltages proportional to the voltage of said circuit, and means connected to the circuit of said windings so as to provide resonant circuits therefor when a short circuit causes the voltages normally applied to said windings to be reduced.

3. In a mho relay for an alternating current circuit, a movable member, means for exerting on said member an operating torque proportional to the product of a voltage and a current of said circuit and a function of the phase angle between said voltage and current, voltage restraint means for said member comprising a plurality of windings energized by voltages proportional to the voltage of said circuit, and means for delaying for a predetermined time any substantial change in the voltage applied to said windings when the voltage of said circuit suddenly decreases.

4. In a mho relay for an alternating current circuit, a movable member, means for exerting on said member an operating torque proportional to the product of a voltage and a current of said circuit and a function of the phase angle between said voltage and current including a voltage winding energized by a voltage of said circuit, voltage restraint means for said member comprising said voltage winding and another voltage winding energized by a voltage proportional to the voltage of said circuit, and means for delaying for a predetermined time any substantial change in the voltage applied to said windings when the voltage of said circuit suddenly decreases.

ALBERT R. van C. WARRINGTON.